Feb. 6, 1962 F. W. ROHE 3,019,865
FLOATING MOLDED INSERT
Filed Nov. 16, 1959
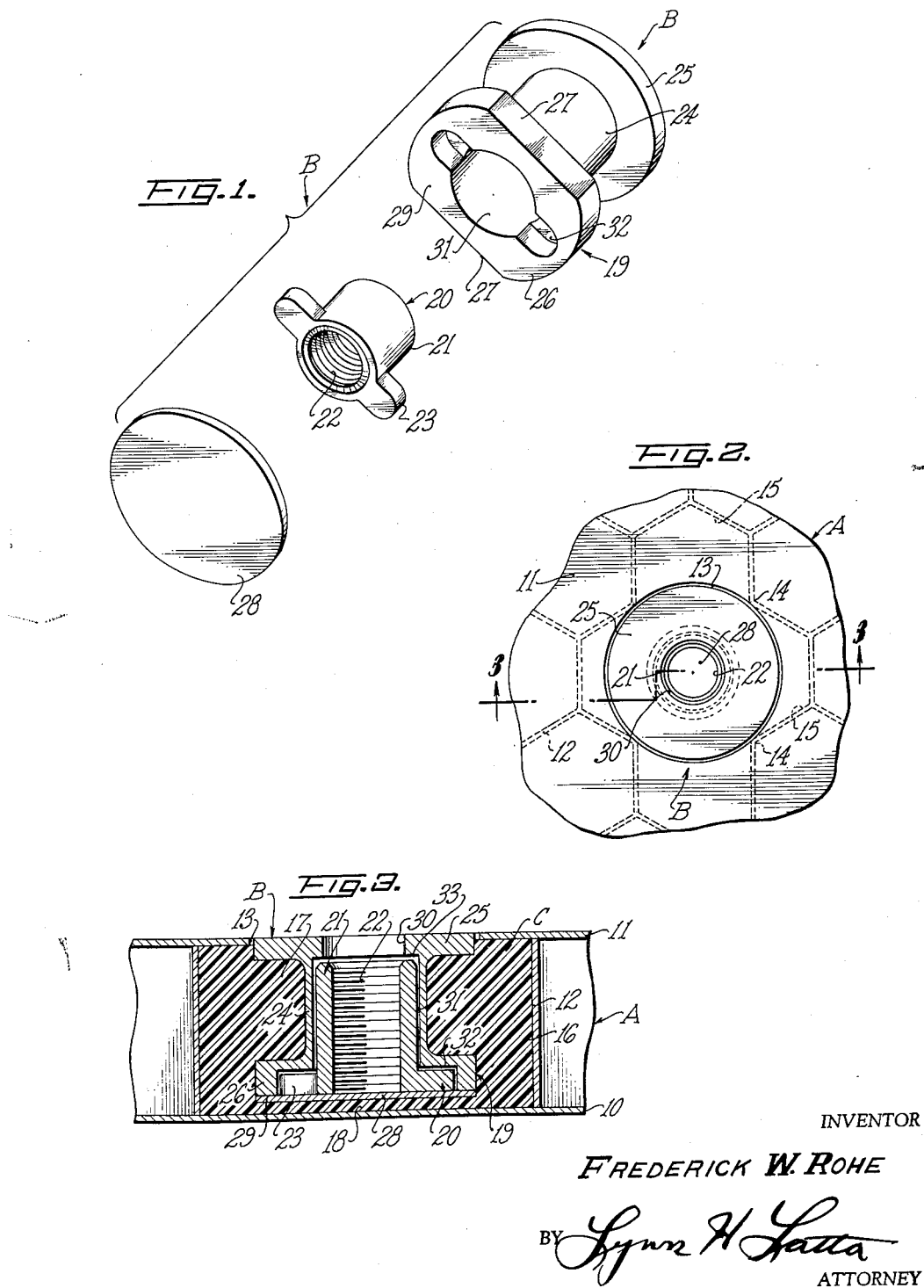
INVENTOR
FREDERICK W. ROHE
BY Lynn H. Latta
ATTORNEY

United States Patent Office 3,019,865
Patented Feb. 6, 1962

3,019,865
FLOATING MOLDED INSERT
Frederick W. Rohe, 879 S. East St., Anaheim, Calif.
Filed Nov. 16, 1959, Ser. No. 853,138
5 Claims. (Cl. 189—34)

This application is a continuation in part of my copending application S.N. 702,009, filed December 11, 1957, for Moldable Insert Panel and Method of Assembly, and of my earlier application S.N. 641,620, filed February 21, 1957, for Sandwich Panel and Flanged Insert Nut Assembly, now U.S. Patent No. 2,880,830, issued April 7, 1959.

This invention relates generally to fastener fittings for lightweight sandwich panels such as are used in the interior wall and floor construction of airplane fuselages, and in particular to the type of fastener fitting known in the industry as the "Molded Insert" fastener. In general, such fasteners utilize a solidified body of cement or anchoring material, such as epoxy resin, molded into a cavity in the sandwich panel and around the insert so as to anchor the insert within the panel with one end of the insert exposed in an opening in one side of the panel, for attachment to the insert (and thus to the panel) of another fastener part (e.g. a threaded stud or screw extended through a bracket or other member to be attached to the panel and threaded into the insert).

The general object of the present invention is to provide an improved lightweight sandwich panel construction embodying an insert anchored therein by a molded body and having a floating nut for self aligning reception of a threaded stud or screw.

A further object is to provide an improved assembly of insert shell and floating nut caged therein, for insertion in a hole in a lightweight sandwich panel and adapted to be anchored therein by a molded body of anchoring material molded into the panel recess and around the insert shell.

A further object is to provide such a molded insert which is of relatively simple and inexpensive construction yet extremely sturdy and durable, readily installed by a molding process, and fairly secure and dependable in providing an anchoring connection between a lightweight fragile sandwich panel and the member or part secured thereto by a fastener element coupled to the insert.

Other objects and advantages will be come apparent in the ensuing specification and appended drawing in which:

FIG. 1 is an exploded perspective view of the assembly of parts comprising my improved molded insert;

FIG. 2 is a plan view of a lightweight sandwich panel and insert structure embodying the invention; and FIG. 3 is an axial sectional view of the same taken on the line 3—3 of FIG. 2.

Referring now to the drawing in detail, I have shown therein, as an example of one form in which the invention may be embodied, a panel and insert structure comprising, in general, a lightweight honeycomb core type of sandwich panel indicated generally at A, my improved floating insert unit, indicated generally at B, and an anchoring body of molded material C anchoring the insert into a recess in the panel A.

The panel A comprises, in general, a pair of skin sheets 10 and 11 secured, as by cementing, brazing or welding to the edges of a low density core 12 of honeycomb cellular construction. To receive the insert B, the panel A is provided with a hole 13 which is bored through the skin sheet 11 and through the cellular core 12, stopping at the inner face of the opposite skin sheet 10. As will be seen in FIGS. 2 and 3, the hole 13 includes a circular opening in the skin sheet 11 and is bounded by radially inwardly projecting extremities 14 of the cellular wall of core 12, tangent to a cylindrical path of boring by the hole saw or end milling cutter used in boring the hole. Between the projections 14, the hole 13 includes lateral recesses 15 (FIG. 2) projecting radially outwardly from the diameter of the opening in the skin sheet, which overhangs the recesses 15.

The body of molded material C, in filling the hole 13, has a series of lateral wings 16 projecting into the recesses 15 and locking the molded anchor body into the panel, as well as a central annular body 17 which encircles and adheres to the shell of the insert B. Preferably, the molded body C also includes a thin flat pad 18 adhering to the inner surface of skin sheet 10 and to the end of the insert B to provide maximum area of bonding connection between the insert and the panel A.

The insert B comprises a shell, indicated generally at 19, and a floating nut, indicated generally at 20. Nut 20 comprises a cylindrical sleeve portion 21 having an internally threaded bore 22, and a pair of radially projecting keys 23 at the end thereof adjacent the closed bottom or side of opening 13.

Shell 19 comprises a cylindrical tubular barrel 24, an integral outer head 25 in the form of a flat circular radial flange, an inner head 26 also in the form of a flat radial flange but of greater thickness than head 25, and having chordal flats 27 on diametrically opposite sides thereof, and a thin flat circular closure disc 28 which is secured, as by brazing or welding, to the end face 29 (FIG. 1) of head 26.

In the head 25 is a central opening 30 through which a threaded stud or screw can be inserted and threaded into the nut 20. Within the barrel 24 of the shell 19 is a counterbore 31 which loosely receives the internally threaded sleeve 21 of nut 20, with substantial radial clearance to accommodate radial self-aligning shifting of the nut 20. Within the inner head 26 are a pair of diametrically opposed key recesses 32 which receive the keys 23 of the nut 20 with axial, radial and circumferential clearance such as to provide for full self aligning movements of the nut 20 when engaged by a threaded stud or bolt, and such as to permit the outer end of the nut to be drawn into seating engagement with the shoulder 33 defined at the bottom of counterbore 31.

The counterbore 31, its outer end shoulder 33, the key slots 32 and the end disc 28, cooperate to define a socket which is closed except for the bolt insertion opening 30 in head 25. The nut 20 is caged in this socket.

In the installation of the insert, a body of anchoring material of high adhesive tenacity when solidified, is injected into the hole 13 in the panel A in a liquid or semi-liquid form.

A catalyst or curing agent, for causing the body of liquid resin to solidify into a hard, rigid anchor body, is mixed with the resin prior to insertion. The insert B is then pushed into the soft body of resin through the open end of the hole 13, extruding the resin up around the sides of the shell 19. The quantity of resin inserted into the hole 13 is such that the resin body will rise approximately into contact with the inner surface of skin sheet 11 when the insert head 25 has been brought to a position flush with the outer surface thereof. In this position, the closure disc 28 will be slightly spaced from the opposite skin sheet 10 so as to leave the thin pad 18 of resin interposed between the closure disc and the sheet 10.

The engagement of the hardened resin body against the outer face of the inner head 26, and against the inner face of skin sheet 11 will effectively secure the insert against being pulled out of the hole 13 when tension is applied to the nut 20 by a stud or bolt tightly screwed thereinto, if the part being fastend to the panel does not seat against the outer end face of flange 25. Where such seating does occur, the end load developed by tightening the bolt in nut 20 will be taken directly by the head 25 as interposed solidly between the part and the end of nut sleeve 21. The engagement of the anchor body against the flat faces 27 of the inner head 26, and the keyed engagement of the radially projecting portions 16 of the anchor body in the recesses 15, will effectively resist rotation of the shell 19. The shell 19 in turn will lock the nut 20 against rotation through the keyed engagement of the keys 23 in the key recesses 32.

I claim:

1. In combination with a lightweight panel including a honeycomb core and skin sheets secured to the edges thereof, said panel having therein a hole beginning with a circular opening in one of said skin sheets and continuing through said core approximately to the opposite skin sheet; an insert including a shell having an outer head in the form of a flat circular radial flange disposed in the opening in said one skin sheet and closing the outer end of said hole, having an inner head of radial flange form, spaced axially from said outer head and disposed adjacent the bottom of said hole, said inner head being radially elongated and having, in its end face, key recesses in diametrically opposite end portions thereof, and a tubular barrel integrally joining said heads, said outer head having a central opening for receiving a fastener bolt, said barrel having a cylindrical counterbore communicating with said opening at one end and with said key recesses at its other end; a nut including an integrally threaded sleeve portion received in said counterbore and a pair of diametrically opposite integral keys projecting radially from one end of said sleeve portion and received in said key recesses; a thin disc secured to the end face of said inner head closing the inner end of said shell, and projecting over said key recesses to define a pair of pockets in which said keys are retained loosely, said sleeve having radial clearance in said counterbore so as to have a floating, self aligning action in receiving the end of a bolt extended through said outer head opening; and a body of solidified plastic material molded around said shell and within said hole, said molded body having keyed rotation-resisting engagement with said honeycomb core and engaging said elongated inner head to resist rotation of said shell in said panel, said shell in turn securing said nut against rotation through the keyed engagement of said nut keys in said key recesses, said body of material including a thin pad interposed between said disc and said opposite skin sheet adhering to both.

2. In combination with a lightweight panel including a honeycomb core and skin sheets secured to the edges thereof, said panel having therein a hole beginning with a circular opening in one of said skin sheets and continuing through said core to the opposite skin sheet; an insert including a shell having an outer head in the form of a flat circular radial flange fitted in the opening in said one skin sheet with its outer end face flush with the outer face of said one skin sheet and closing said opening, having an inner head of radial flange form, spaced axially from said outer head and disposed adjacent said other skin sheet at the bottom of said hole, said inner head having marginal flats and having, in its end face, a radially extending key recess, and a tubular barrel integrally joining said heads, said outer head having a central opening for receiving a fastener bolt, said barrel having a cylindrical counterbore communication with said opening at one end and with said key recess at its other end; and a nut including an internally threaded sleeve portion received in said counterbore and an integral key projecting radially from one end of said sleeve portion and received in said key recess; a thin disc secured to the end face of said inner head, closing the inner end of said shell, and projecting over said key recess to define a pocket in which said key is retained loosely, said sleeve having radial clearance in said counterbore so as to have a floating, self aligning action in receiving the end of a bolt extended through said outer head opening; and a body of solidified plastic material molded around said shell and within said hole, said molded body having keyed rotation-resisting engagement with said honeycomb core and engaging said marginal flats of said inner head to resist rotation of said shell in said panel, said shell in turn securing said nut against rotation through the keyed engagement of said nut key in said key recess, said body of material including a thin pad interposed between said disc and said opposite skin sheet and adhering to both.

3. In combination with a lightweight panel including a honeycomb core and skin sheets secured to the edges thereof, said panel having therein a hole beginning with a circular opening in one of said skin sheets and continuing through said core to the opposite skin sheet; an insert including a shell having an outer head in the form of a flat circular radial flange disposed in said circular opening and closing the outer end of said hole, having an inner head of radial flange form, spaced axially from said outer head and disposed in slightly spaced parallel relation to the other skin sheet at the bottom of said hole, said inner head being radially elongated, with chordal flats at opposite sides thereof, and having, in its end face, key recesses extending radially in diametrically opposite end portions thereof, and a cylindrical tubular barrel integrally joining said heads, said outer head having a central opening for receiving a fastner bolt, said barrel having a cylindrical counterbore communicating with said opening at one end and with said key recesses at its other end; a nut including an internally threaded sleeve portion received in said counterbore and a pair of integral keys projecting radially from one end of said sleeve portion and received in said key recesses; a thin closure disc secured to the end face of said inner head and cooperating with said counterbore and key recesses to define a closed bottom socket in which said nut is caged with radial and circumferential clearance so as to have a floating, self aligning action in receiving the end of a bolt extended through said outer head opening; and a body of solidified epoxy resin molded around said shell and within said hole, said molded body including a thin pad of said resin interposed between and adhering to said closure disc and the inner face of said other skin sheet, and having keyed rotation resisting engagement with said honeycomb core and engaging said chordal flats to resist rotation of said shell in said panel, said shell in turn securing said nut against rotation through the keyed engagement of said nut keys in said key recesses.

4. For installation in a lightweight panel including a honeycomb core and skin sheets secured to the edges thereof, said panel having therein a hole beginning with a circular opening in one of said skin sheets and continuing through said core to the opposite skin sheet; an insert including a shell having an outer head in the form of a flat circular radial flange receivable in said circular opening for closing the outer end of said hole, having an inner head of radial flange form, spaced axially from said outer head and adapted to be disposed adjacent the other skin sheet at the bottom of said hole, said inner head having a key recess in its end face, and a tubular barrel integrally joining said heads, said outer head having a central opening for receiving a fastener bolt, said barrel having a cylindrical counterbore communicating with said opening at one end and with said key recess at its other end; a nut including an internally threaded sleeve portion received in said counterbore and an integral key projecting radially from one end of said sleeve portion and received in said key recess; and a thin closure disc secured to the end face of said inner head and cooperating with said counterbore and key recess to define a closed bottom socket in which said nut is caged with radial and circumferential clearance so as to have a floating, self aligning action in receiving the end of a bolt extended through said outer head opening; said insert being adapted to be anchored by a body of solidified plastic material molded around said shell and within said hole, with said molded body developing keyed rotation resisting engagement with said honeycomb core and adhering to said shell to resist rotation of said shell in said panel, said shell in turn securing said nut against rotation through the keyed engagement of said nut key in said key recess.

5. For installation in a lightweight panel including a honeycomb core and skin sheets secured to the edges thereof, said panel having therein a hole beginning with a circular opening in one of said skin sheets and continuing through said core to the opposite skin sheet; an insert including a shell having an outer head in the form of a flat circular radial flange adapted to be fitted in said circular opening for closing the outer end of said hole, having an inner head of radial flange form, spaced axially from said outer head and adapted to be disposed adjacent the bottom of said hole, said inner head being radially elongated, having chordal flats on opposite sides thereof, and having key recesses in diametrically opposite end portions of its end face, and a cylindrical tubular barrel integrally joining said heads, said outer head having a central opening for receiving a fastener bolt, said barrel having a cylindrical counterbore communicating with said opening at one end and with said key recesses at its other end; and a nut including an internally threaded sleeve portion received in said counterbore and a pair of integral keys projecting radially in diametrically opposite directions from one end of said sleeve portion and received in said key recesses; and a thin closure disc secured to the end face of said inner head and cooperating with said counterbore and key recesses to define a closed bottom socket in which said nut is caged with radial and circumferential clearance so as to have a floating, self aligning action in receiving the end of a bolt extended through said outer head opening; said insert being adapted to be anchored by a body of solidified plastic material molded around said shell and within said hole, with said molded body developing keyed rotation resisting engagement with said honeycomb core and engaging said elongated inner head to resist rotation of said shell in said panel, said shell in turn securing said nut against rotation through the keyed engagement of said nut keys in said key recesses.

References Cited in the file of this patent
UNITED STATES PATENTS

| | | |
|---|---|---|
| 2,255,184 | Osenberg | Sept. 9, 1941 |
| 2,585,557 | Kreimendahl | Feb. 12, 1952 |
| 2,639,179 | Phelps | May 19, 1953 |
| 2,880,830 | Rohe | Apr. 7, 1959 |